United States Patent
Chan (10) Patent No.: US 11,303,216 B2
(45) Date of Patent: Apr. 12, 2022

(54) POWER SUPPLY DEVICE FOR ELIMINATING RINGING EFFECT

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/191,950

(22) Filed: Mar. 4, 2021

(65) Prior Publication Data
US 2022/0006377 A1    Jan. 6, 2022

(30) Foreign Application Priority Data

Jul. 1, 2020   (TW) ................................ 109122205

(51) Int. Cl.
*H02M 3/335*   (2006.01)
*H02M 1/44*    (2007.01)
*H02M 1/00*    (2006.01)

(52) U.S. Cl.
CPC ......... *H02M 3/33576* (2013.01); *H02M 1/44* (2013.01); *H02M 1/0048* (2021.05)

(58) Field of Classification Search
CPC ... H02M 1/44; H02M 3/33576; H02M 1/0048
See application file for complete search history.

(56) References Cited

U.S. PATENT DOCUMENTS

| | | | | |
|---|---|---|---|---|
| 4,688,159 A * | 8/1987 | Marinus | ............... | H02M 3/3385 362/21 |
| 4,692,852 A * | 9/1987 | Hoover | .................. | H04N 3/185 363/21.16 |
| 5,117,347 A * | 5/1992 | Rebello | ............. | H02M 3/33546 363/56.09 |
| 5,321,596 A * | 6/1994 | Hurst | .................. | H02M 7/4807 363/127 |
| 5,812,383 A * | 9/1998 | Majid | ............... | H02M 3/33523 363/21.05 |
| 5,995,384 A * | 11/1999 | Majid | ............... | H02M 3/33523 363/21.18 |

(Continued)

OTHER PUBLICATIONS

European Search Report dated Aug. 17, 2021, issued in application No. EP 21161185.0.

*Primary Examiner* — Yusef A Ahmed
(74) *Attorney, Agent, or Firm* — McClure, Qualey & Rodack, LLP (57) ABSTRACT

A power supply device for eliminating the ringing effect includes a bridge rectifier, a first transformer, a second transformer, a third transformer, a power switch element, a delay and stabilization circuit, an output stage circuit, and a controller. The bridge rectifier generates a rectified voltage according to a first input voltage and a second input voltage. The first transformer generates an induced voltage according to the rectified voltage. A magnetizing inductor is built in the first transformer. A parasitic capacitor is built in the power switch element. The second transformer generates a control voltage according to a resonant voltage between the magnetizing inductor and the parasitic capacitor. The output stage circuit includes a plurality of discharge paths and generates an output voltage. The discharge paths are selectively enabled or disabled according to the control voltage.

14 Claims, 4 Drawing Sheets

(56) References Cited

U.S. PATENT DOCUMENTS

| | | | | |
|---|---|---|---|---|
| 6,385,061 B1* | 5/2002 | Turchi | .................... | H02M 1/36 363/21.15 |
| 6,434,030 B1* | 8/2002 | Rehm | ................ | H02M 3/33515 363/97 |
| 6,456,511 B1* | 9/2002 | Wong | ................ | H02M 3/33523 363/21.13 |
| 6,462,437 B1* | 10/2002 | Marmaropoulos | ..... | H02J 9/005 307/125 |
| 7,054,170 B2* | 5/2006 | Yang | ................ | H02M 3/33507 363/21.13 |
| 7,253,997 B2* | 8/2007 | Balakrishnan | .......... | H02M 1/32 361/18 |
| 9,093,905 B2* | 7/2015 | So | .................... | H02M 3/33507 |
| 10,157,702 B2* | 12/2018 | Lin | ........................ | H01F 27/292 |
| 10,193,454 B2* | 1/2019 | Espino | .................... | H02M 1/08 |
| 10,749,364 B2* | 8/2020 | Dai | ............................ | H02J 7/00 |
| 10,790,752 B1* | 9/2020 | Chan | ...................... | H02H 3/243 |
| 10,993,299 B1* | 4/2021 | Chan | ...................... | H05B 45/36 |
| 11,211,864 B2* | 12/2021 | Chan | ...................... | H02M 3/156 |
| 2006/0176715 A1* | 8/2006 | Hosotani | .......... | H02M 3/33569 363/21.01 |
| 2009/0122578 A1* | 5/2009 | Beltran | ............. | H02M 3/33523 363/16 |
| 2009/0316444 A1* | 12/2009 | Yamaguchi | ......... | H02M 3/3353 363/21.12 |
| 2010/0265742 A1* | 10/2010 | Hu | .................... | H02M 3/33523 363/21.13 |
| 2011/0002446 A1* | 1/2011 | Beland | .................... | H05G 1/10 378/111 |
| 2011/0103100 A1* | 5/2011 | Hosotani | .................. | H01F 3/10 363/21.02 |
| 2011/0292691 A1* | 12/2011 | Matsumoto | ....... | H02M 3/33523 363/21.12 |
| 2013/0016535 A1* | 1/2013 | Berghegger | ........ | H02M 1/4258 363/21.15 |
| 2016/0149504 A1* | 5/2016 | Quigley | ............ | H02M 3/33523 363/21.04 |
| 2016/0190938 A1* | 6/2016 | Wang | ................ | H02M 3/33507 363/21.12 |
| 2018/0177010 A1* | 6/2018 | Liu | ................ | H02M 3/33523 |
| 2018/0358902 A1* | 12/2018 | Duvnjak | .......... | H02M 3/33507 |
| 2020/0195160 A1* | 6/2020 | Mayell | ............. | H02M 3/33523 |
| 2020/0251997 A1* | 8/2020 | Chan | ................. | H02M 3/33507 |
| 2020/0403507 A1* | 12/2020 | Chan | ...................... | H02M 1/44 |
| 2021/0184582 A1* | 6/2021 | Chan | ...................... | H02M 1/36 |
| 2021/0313792 A1* | 10/2021 | Chan | ...................... | H02M 1/0025 |
| 2021/0408922 A1* | 12/2021 | Zhang | .................... | H02M 3/01 |

\* cited by examiner

POWER SUPPLY DEVICE FOR ELIMINATING RINGING EFFECT

CROSS REFERENCE TO RELATED APPLICATIONS

This application claims priority of Taiwan Patent Application No. 109122205 filed on Jul. 1, 2020, the entirety of which is incorporated by reference herein.

BACKGROUND OF THE INVENTION

Field of the Invention

The disclosure generally relates to a power supply device, and more specifically, to a power supply device for eliminating the ringing effect.

Description of the Related Art

In a conventional power supply device, the non-ideal parasitic capacitance of a power switch element tends to generate ringing, which not only leads to relatively large switching loss but also reduces the overall conversion efficiency of the power supply device. Accordingly, there is a need to propose a novel solution for solving the problems of the prior art.

BRIEF SUMMARY OF THE INVENTION

In a preferred embodiment, the invention is directed to a power supply device for eliminating the ringing effect. The power supply device includes a bridge rectifier, a first transformer, a second transformer, a third transformer, a power switch element, a delay and stabilization circuit, an output stage circuit, and a controller. The bridge rectifier generates a rectified voltage according to a first input voltage and a second input voltage. The first transformer includes a first main coil and a first secondary coil. A magnetizing inductor is built in the first transformer. The first main coil receives the rectified voltage. The first secondary coil generates an induced voltage. The power switch element selectively couples the first main coil to a ground according to a clock voltage. A parasitic capacitor is built in the power switch element. The second transformer includes a second main coil and a second secondary coil. The second main coil receives a resonant voltage between the magnetizing inductor and the parasitic capacitor. The second secondary coil generates a control voltage. The output stage circuit includes a plurality of discharge paths. The output stage circuit generates an output voltage and a feedback voltage according to the induced voltage and the control voltage. The discharge paths are selectively enabled or disabled according to the control voltage. The third transformer includes a third main coil and a third secondary coil. The third main coil receives the feedback voltage. The third secondary coil is coupled to the delay and stabilization circuit. The controller generates the clock voltage. The clock voltage is transmitted through the delay and stabilization circuit to the power switch element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
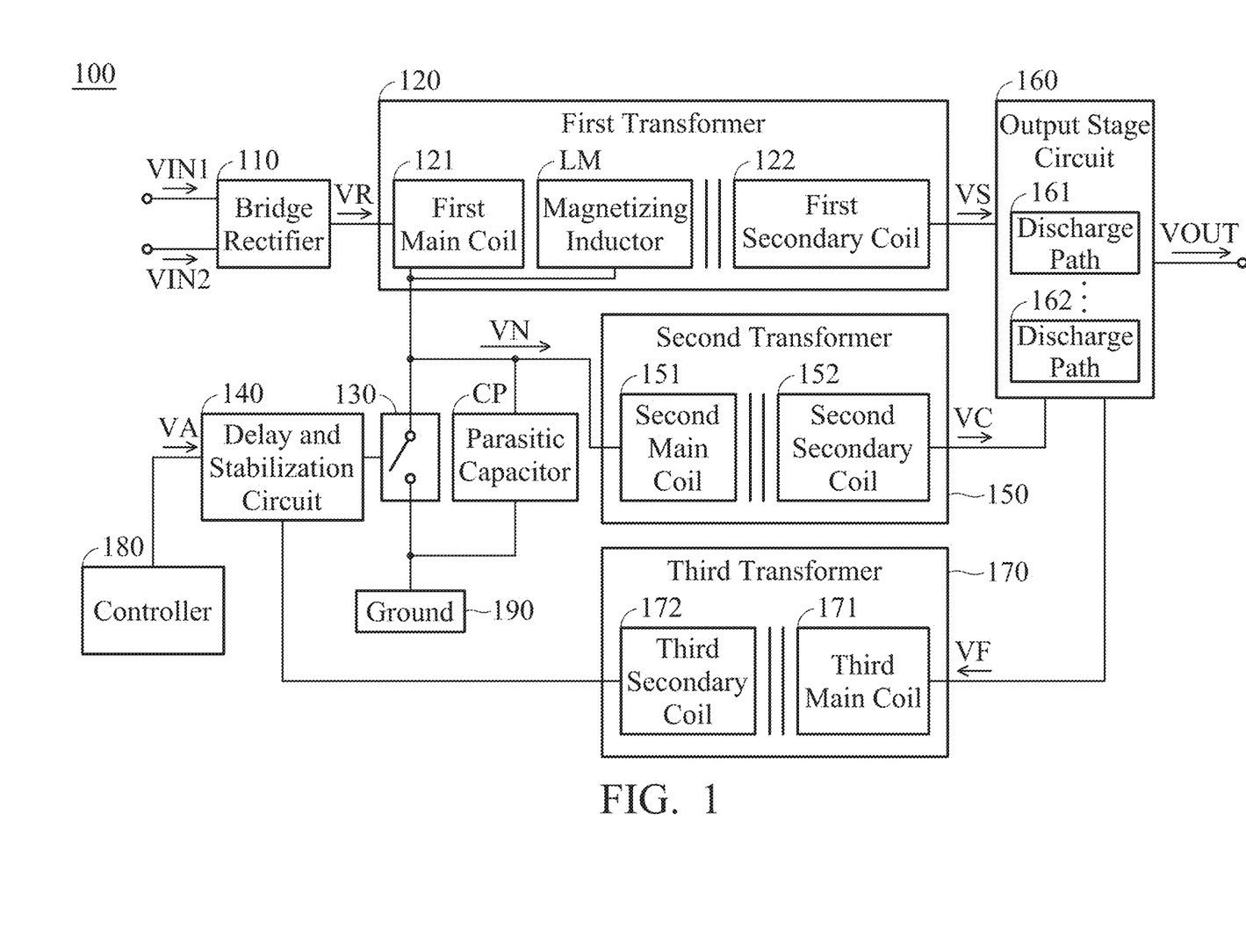
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a bridge rectifier 110, a first transformer 120, a power switch element 130, a delay and stabilization circuit 140, a second transformer 150, an output stage circuit 160, a third transformer 170, and a controller 180. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. The first input voltage VIN1 and the second input voltage VIN2 may be from an external input power source. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The first transformer 120 includes a first main coil 121 and a first secondary coil 122. A magnetizing inductor LM is built in the first transformer 120. The magnetizing inductor LM is an intrinsic element of the first transformer 120, and it is additionally generated when the first transformer 120 is manufactured. The magnetizing inductor LM is not an external independent element. The first main coil 121 and the magnetizing inductor LM are positioned at the same side of the first transformer 120. The first secondary coil 122 is positioned at the opposite side of the first transformer 120. The first main coil 121 receives the rectified voltage VR. In response to the rectified voltage VR, the first secondary coil 122 generates an induced voltage VS. The power switch element 130 selectively couples the first main coil 121 and the magnetizing inductor LM to a ground 190 according to a clock voltage VA. The ground 190 may mean the Earth, or any grounding path coupled to the Earth, and it is not an internal element of the power supply device 100. For example, if the clock voltage VA has a high logic level (e.g., a logic "1"), the power switch element 130 can couple the first main coil 121 and the magnetizing inductor LM to the ground voltage VSS (e.g., the power switch element 130 is similar to a short-circuited path). Conversely, if the clock voltage VA has a low logic level (e.g., a logic "0"), the power switch element 130 cannot couple the first main coil 121 and the magnetizing inductor LM to the ground voltage VSS (e.g., the power switch element 130 is similar to an open-circuited path). In addition, a parasitic capacitor CP is built in the power switch element 130. It should be understood that the total parasitic capacitance between two terminals of the power switch element 130 is models as the aforementioned parasitic capacitor CP, which is not an external independent element. The delay and stabilization circuit 140 is configured to fine-tune and limit the clock voltage VA. The second transformer 150 includes a second main coil 151 and a second secondary coil 152. The second main coil 151 is positioned at a side of the second transformer 150. The second secondary coil 152 is positioned at the opposite side of the second transformer 150. The second main coil 151 receives a resonant voltage VN between the magnetizing inductor LM and the parasitic capacitor CP. In response to the resonant voltage VN, the second secondary coil 152 generates a control voltage VC. The output stage circuit 160 includes a plurality of discharge paths 161 and 162, whose total number is not limited in the invention. The output stage circuit 160 generates an output voltage VOUT and a feedback voltage VF according to the induced voltage VS and the control voltage VC. For example, the output voltage VOUT may be a DC (Direct Current) voltage, whose voltage level may be from 18V to 22V, but it is not limited thereto. The discharge paths 161 and 162 are selectively enabled or disabled according to the control voltage VC. The third transformer 170 includes a third main coil 171 and a third secondary coil 172. The third secondary coil 172 is positioned at a side of the third transformer 170. The third main coil 171 is positioned at the opposite side of the third transformer 170. The third main coil 171 receives the feedback voltage VF. The third secondary coil 172 is coupled to the delay and stabilization circuit 140. That is, the delay and stabilization circuit 140 is controllable according to the feedback voltage VF. The controller 180 generates the clock voltage VA. The clock voltage VA is transmitted through the delay and stabilization circuit 140 to the power switch element 130. For example, the controller 180 may be a PWM (Pulse Width Modulation) IC (Integrated Circuit), but it is not limited thereto. With such a design, once a ringing effect is induced between the magnetizing inductor LM of the first transformer 120 and the parasitic capacitor CP of the power switch element 130, the output stage circuit 160 and the delay and stabilization circuit 140 can appropriately limit the range of the resonant voltage VN, thereby reducing this non-ideal characteristic. Therefore, the invention can decrease the switching loss of the power switch element 130 and increase the conversion efficiency of the power supply device 100.

The following embodiments will introduce the detailed structure and operation of the power supply device 100. It should be understood these figures and descriptions are merely exemplary, rather than limitations of the invention.

Figure 2:
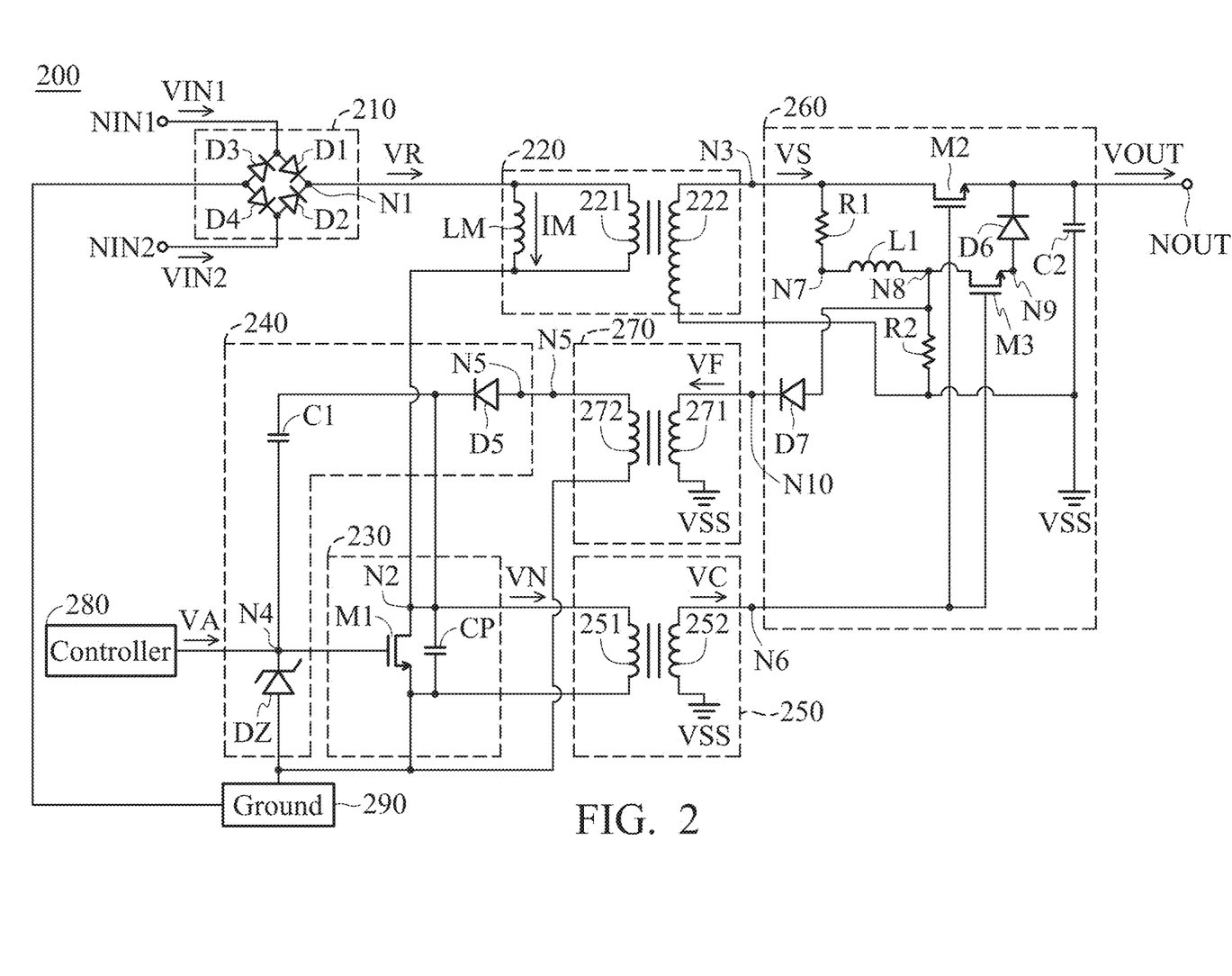
FIG. 2 is a diagram of a power supply device according to an embodiment of the invention.

FIG. 2 is a diagram of a power supply device 200 according to an embodiment of the invention. In the embodiment of FIG. 2, the power supply device 200 with a first input node NIN1, a second input node NIN2 and an output node NOUT includes a bridge rectifier 210, a first transformer 220, a power switch element 230, a delay and stabilization circuit 240, a second transformer 250, an output stage circuit 260, a third transformer 270, and a controller 280. The first input node NIN1 and the second input node NIN2 of the power supply device 200 are arranged for receiving a first input voltage VIN1 and a second input voltage VIN2 from an external input power source, respectively. An AC voltage difference with any frequency and any magnitude may be formed between the first input voltage VIN1 and the second input voltage VIN2. The output node NOUT of the power supply device 200 is arranged for outputting an output voltage VOUT to an electronic device. The output voltage VOUT may be substantially a DC voltage.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground 290, and a cathode coupled to the first input node NIN1. The ground 290 may mean the Earth, or any grounding path coupled to the Earth, and it is not an internal element of the power supply device 200. The fourth diode D4 has an anode coupled to the ground 290, and a cathode coupled to the second input node NIN2.

The first transformer 220 includes a first main coil 221 and a first secondary coil 222. A magnetizing inductor LM is built in the first transformer 220. The magnetizing inductor LM is an intrinsic element of the first transformer 220, and it is additionally generated when the first transformer 220 is manufactured. The magnetizing inductor LM is not an external independent element. The first main coil 221 and the magnetizing inductor LM are positioned at the same side of the first transformer 220. The first secondary coil 222 is positioned at the opposite side of the first transformer 220. The first main coil 221 has a first terminal coupled to the first node N1 for receiving the rectified voltage VR, and a second terminal coupled to a second node N2. The first secondary coil 222 has a first terminal coupled to a third node N3 for outputting an induced voltage VS, and a second terminal coupled to a ground voltage VSS (e.g., 0V). The magnetizing inductor LM has a first terminal coupled to the first node N1, and a second terminal coupled to the second node N2.

The power switch element 230 includes a first transistor M1. The first transistor M1 may be an NMOS transistor (N-type Metal Oxide Semiconductor Field Effect Transistor). The first transistor M1 has a control terminal coupled to a fourth node N4 for receiving a clock voltage VA from the controller 280, a first terminal coupled to the ground 290, and a second terminal coupled to the second node N2. A parasitic capacitor CP is built in the power switch element 230. Specifically, the parasitic capacitor CP has a first terminal coupled to the second node N2, and a second terminal coupled to the ground 290. It should be understood that the total parasitic capacitance between the first terminal and the second terminal of the first transistor M1 is models as the aforementioned parasitic capacitor CP, which is not an external independent element.

The controller 280 outputs the clock voltage VA at the fourth node N4. The clock voltage VA is used to adjust the duty cycle of the power switch element 230. For example, the clock voltage VA may be maintained at a constant voltage level when the power supply device 200 is initialized, and the clock voltage VA may provide periodic clock waveforms when the power supply device 200 is normally operated. It should be noted that the clock voltage VA can be further fine-tuned and limited by the delay and stabilization circuit 240.

The delay and stabilization circuit 240 includes a Zener diode DZ, a first capacitor C1, and a fifth diode D5. The Zener diode DZ has an anode coupled to the ground 290, and a cathode coupled to the fourth node N4. The first capacitor C1 has a first terminal coupled to the second node N2, and a second terminal coupled to the fourth node N4. The fifth diode D5 has an anode coupled to a fifth node N5, and a cathode coupled to the second node N2.

The second transformer 250 includes a second main coil 251 and a second secondary coil 252. The second main coil 251 is positioned at a side of the second transformer 250. The second secondary coil 252 is positioned at the opposite side of the second transformer 250. The second main coil 251 has a first terminal coupled to the second node N2 for receiving a resonant voltage VN between the magnetizing inductor LM and the parasitic capacitor CP, and a second terminal coupled to the ground 290. The second secondary coil 252 has a first terminal coupled to a sixth node N6 for outputting a control voltage VC, and a second terminal coupled to the ground voltage VSS.

The output stage circuit 260 includes a second transistor M2, a third transistor M3, a sixth diode D6, a seventh diode D7, an inductor L1, a second capacitor C2, a first resistor R1, and a second resistor R2. Each of the second transistor M2 and the third transistor M3 may be an NMOS transistor. The second transistor M2 has a control terminal coupled to the sixth node N6 for receiving the control voltage VC, a first terminal coupled to the output node NOUT, and a second terminal coupled to the third node N3 for receiving the induced voltage VS. The first resistor R1 has a first terminal coupled to the third node N3, and a second terminal coupled to a seventh node N7. The inductor L1 has a first terminal coupled to the seventh node N7, and a second terminal coupled to an eighth node N8. The third transistor M3 has a control terminal coupled to the sixth node N6 for receiving the control voltage VC, a first terminal coupled to a ninth node N9, and a second terminal coupled to the eighth node N8. The sixth diode D6 has an anode coupled to the ninth node N9, and a cathode coupled to the output node NOUT. The second capacitor C2 has a first terminal coupled to the output node NOUT, and a second terminal coupled to the ground voltage VSS. The second resistor R2 has a first terminal coupled to the eighth node N8, and a second terminal coupled to the ground voltage VSS. The seventh diode D7 has an anode coupled to the eighth node N8, and a cathode coupled to a tenth node N10 for outputting a feedback voltage VF.

The third transformer 270 includes a third main coil 271 and a third secondary coil 272. The third secondary coil 272 is positioned at a side of the third transformer 270. The third main coil 271 is positioned at the opposite side of the third transformer 270. The third main coil 271 has a first terminal coupled to the tenth node N10 for receiving the feedback voltage VF, and a second terminal coupled to the ground voltage VSS. The third secondary coil 272 has a first terminal coupled to the fifth node N5, and a second terminal coupled to the ground 290. In some embodiments, an integrated transformer is formed by the first transformer 220, the second transformer 250, and the third transformer 270. The first main coil 221, the third secondary coil 272, and the second main coil 251 may be positioned at the same side of the integrated transformer. The first secondary coil 222, the third main coil 271, and the second secondary coil 252 may be positioned at the opposite side of the integrated transformer.

In some embodiments, the power supply device 200 operates in an initial mode, a first mode, a second mode, or a third mode, whose operation principles will be described as follows.

In the initial mode, the power supply device 200 has not received the first input voltage VIN1 and the second input voltage VIN2. The first transistor M1, the second transistor M2, the third transistor M3, the fifth diode D5, the sixth diode D6, and the seventh diode D7 are all disabled.

In the first mode, the power supply device 200 has received the first input voltage VIN1 and the second input voltage VIN2. The clock voltage VA has a high logic level, and the first transistor M1 is enabled. At this time, a reverse breakdown occurs in the Zener diode DZ, so as to stabilize the clock voltage VA. An inductive current IM flowing through the magnetizing inductor LM is gradually increasing. The second transistor M2, the third transistor M3, the fifth diode D5, the sixth diode D6, and the seventh diode D7 are all disabled.

In the second mode, the clock voltage VA has a low logic level, and the first transistor M1 is disabled. At this time, the resonant voltage VN at the second node N2 suddenly rises up, such that the relatively high control voltage VC enables the second transistor M2 and the third transistor M3. The energy stored in the magnetizing inductor LM is indirectly released through the first transformer 220 to the ground voltage VSS by three discharge paths of the output stage circuit 260. Specifically, a first discharge path is formed by the second transistor M2 and the second capacitor C2; a second discharge path is formed by the first resistor R1, the inductor L1, and the second resistor R2; and a third discharge path is formed by the first resistor R1, the inductor L1, the third transistor M3, the sixth diode D6, and the second capacitor C2. When the inductive current IM flowing through the magnetizing inductor LM is exactly reduced to 0 (i.e., the energy stored in the magnetizing inductor LM has been completely released), the power supply device 200 is switched from the second mode into the third mode.

In the third mode, the second transistor M2 and the third transistor M3 are switched from enable states into disable states. The magnetizing inductor LM of the first transformer 220 starts to resonate with the parasitic capacitor CP of the power switch element 230. At this time, according to Lenz's law, a voltage reverse effect occurs to the magnetizing inductor LM, which has no inductive current IM flowing therethrough (i.e., the voltage at the eighth node N8 becomes higher), so as to enable the seventh diode D7 and pull up the feedback voltage VF. By using the third transformer 270 and the delay and stabilization circuit 240, the relatively high feedback voltage VF can fine-tune and limit the resonant voltage VN, and it can also delay the clock voltage VA. Next, the power supply device 200 will enter the first mode again.

Figure 3:
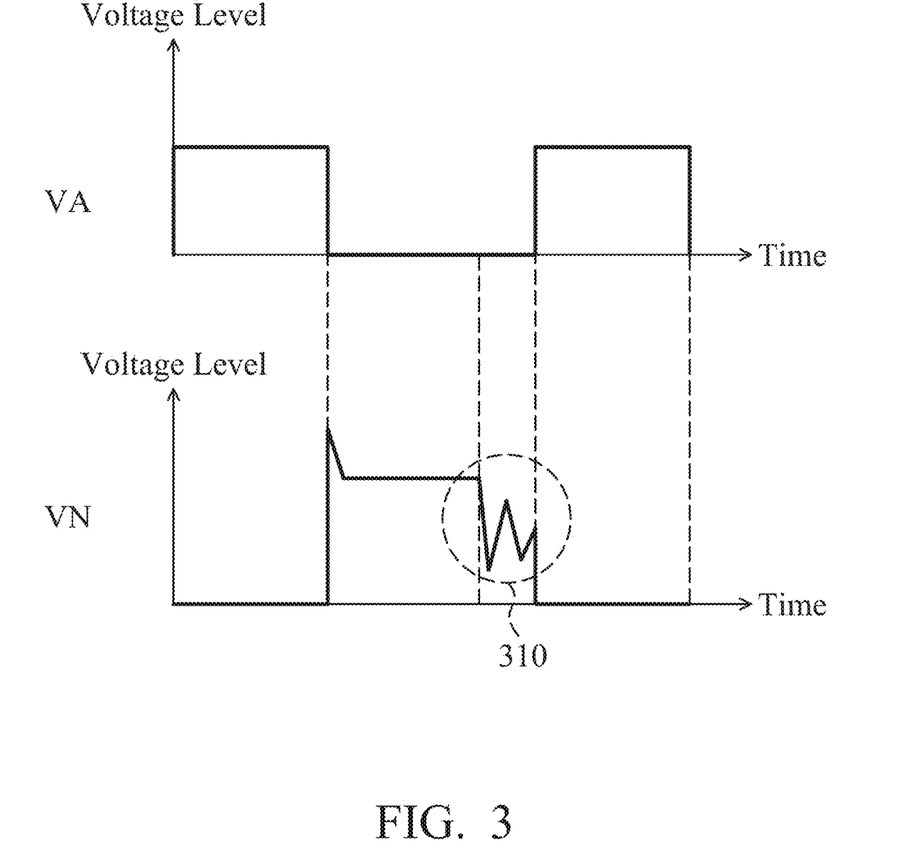
FIG. 3 is a diagram of voltage waveforms of a conventional power supply device.

FIG. 3 is a diagram of voltage waveforms of a conventional power supply device. The horizontal axis represents time, and the vertical axis represents voltage levels. According to the measurement of FIG. 3, if the output stage circuit 260 and its discharge paths are not used, there may be a serious ringing effect induced between the parasitic capacitor CP and the magnetizing inductor LM (as indicated by a first dash-line box 310).

Figure 4:
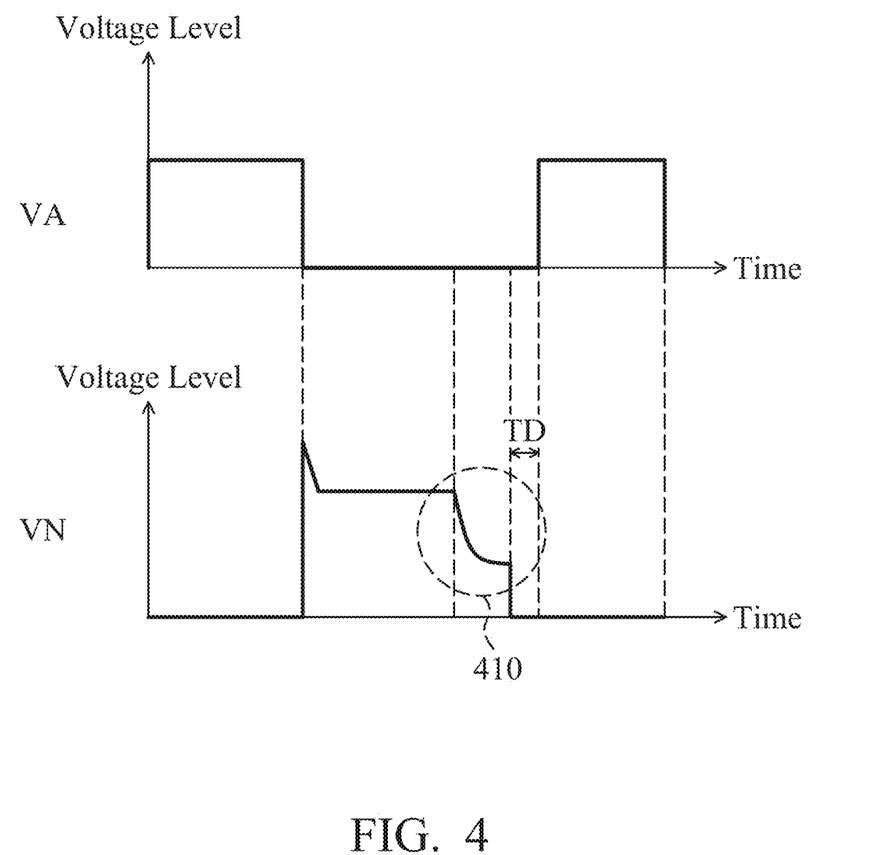
FIG. 4 is a diagram of voltage waveforms of a power supply device according to an embodiment of the invention.

FIG. 4 is a diagram of voltage waveforms of the power supply device 200 according to an embodiment of the invention. The horizontal axis represents time, and the vertical axis represents voltage levels. It should be noted that if the output stage circuit 260 and its discharge paths are used, the resonant voltage VN between the magnetizing inductor LM and the parasitic capacitor CP will be limited to the first wave trough, without undesired up-and-down fluctuations later. Therefore, the ringing effect between the parasitic capacitor CP and the magnetizing inductor LM can be almost eliminated (as indicated by a second dash-line box 410). In addition, the first capacitor C1 delays the clock voltage VA for a predetermined time TD, and thus the first transistor M1 performs a ZVS (Zero Voltage Switch) operation to reduce the switching loss of the power switch element 230. With such a design, the discharging time periods of the output stage circuit 260 are dynamically adjustable according to different requirements, and the conversion efficiency of the power supply device 200 is further enhanced, regardless of light-load, heavy-load, high-voltage, or low-voltage conditions.

In some embodiments, the element parameters of the power supply device 200 are as follows. The inductance of the magnetizing inductor LM may be from 328.5 µH to 401.5 µH, such as 365 µH. The inductance of the inductor L1 may be from 24.7 µH to 28.6 µF, such as 26 µH. The capacitance of the parasitic capacitor CP may be from 120 pF to 180 pF, such as 150 pF. The capacitance of the first capacitor C1 may be from 108 pF to 132 pF, such as 120 pF. The capacitance of the second capacitor C2 may be from 612 µF to 748 µF, such as 680 µF. The resistance of the first resistor R1 may be from 45.6 KΩ to 50.4 KΩ, such as 48 KΩ. The resistance of the second resistor R2 may be from 11.4 KΩ to 12.6 KΩ, such as 12 KΩ. The turn ratio of the first main coil 221 to the first secondary coil 222 may be from 1 to 100, such as 10. The turn ratio of the second main coil 251 to the second secondary coil 252 may be from 1 to 100, such as 20. The turn ratio of the third main coil 271 to the third secondary coil 272 may be from 0.1 to 10, such as 1. The breakdown voltage of the Zener diode DZ may be about 15V. The predetermined time TD may be about 10 ns. The above ranges of parameters are calculated and obtained according to the results of many experiments, and they help to optimize the conversion efficiency of the power supply device 200.

The invention proposes a novel power supply device, which includes an output stage circuit and its discharge paths for suppressing the ringing effect. According to practical measurements, the power supply device using the aforementioned design can almost eliminate the non-ideal characteristics between the transformer and the power switch element. Since the invention can effectively improve the conversion efficiency of the power supply device and reduce the EMI (Electromagnetic Interference), it is suitable for application in a variety of electronic devices.

Note that the above voltages, currents, resistances, inductances, capacitances and other element parameters are not limitations of the invention. A designer can adjust these parameters according to different requirements. The power supply device of the invention is not limited to the configurations of FIGS. 1-4. The invention may merely include any one or more features of any one or more embodiments of FIGS. 1-4. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device for eliminating a ringing effect, comprising:
   a bridge rectifier, generating a rectified voltage according to a first input voltage and a second input voltage;
   a first transformer, comprising a first main coil and a first secondary coil, wherein a magnetizing inductor is built in the first transformer, the first main coil receives the rectified voltage, and the first secondary coil generates an induced voltage;
   a power switch element, selectively coupling the first main coil to a ground according to a clock voltage, wherein a parasitic capacitor is built in the power switch element;
   a delay and stabilization circuit;
   a second transformer, comprising a second main coil and a second secondary coil, wherein the second main coil receives a resonant voltage between the magnetizing inductor and the parasitic capacitor, and the second secondary coil generates a control voltage;
   an output stage circuit, comprising a plurality of discharge paths, wherein the output stage circuit generates an output voltage and a feedback voltage according to the induced voltage and the control voltage, and the discharge paths are selectively enabled or disabled according to the control voltage;
   a third transformer, comprising a third main coil and a third secondary coil, wherein the third main coil receives the feedback voltage, and the third secondary coil is directly connected to the delay and stabilization circuit; and
   a controller, generating the clock voltage, wherein the clock voltage is transmitted through the delay and stabilization circuit to the power switch element;
   wherein when energy stored in the magnetizing inductor is completely released, the output stage circuit uses the third transformer and the delay and stabilization circuit to fine-tune and limit the resonant voltage.

2. The power supply device as claimed in claim 1, wherein the bridge rectifier comprises:
   a first diode, wherein the first diode has an anode coupled to a first input node for receiving the first input voltage, and a cathode coupled to a first node for outputting the rectified voltage;
   a second diode, wherein the second diode has an anode coupled to a second input node for receiving the second input voltage, and a cathode coupled to the first node;
   a third diode, wherein the third diode has an anode coupled to the ground, and a cathode coupled to the first input node; and
   a fourth diode, wherein the fourth diode has an anode coupled to the ground, and a cathode coupled to the second input node.

3. The power supply device as claimed in claim 2, wherein the first main coil has a first terminal coupled to the first node for receiving the rectified voltage, and a second terminal coupled to a second node, and wherein the first secondary coil has a first terminal coupled to a third node for outputting the induced voltage, and a second terminal coupled to a ground voltage.

4. The power supply device as claimed in claim 3, wherein the power switch element comprises:
a first transistor, wherein the first transistor has a control terminal coupled to a fourth node for receiving the clock voltage from the controller, a first terminal coupled to the ground, and a second terminal coupled to the second node.

5. The power supply device as claimed in claim 4, wherein the magnetizing inductor has a first terminal coupled to the first node, and a second terminal coupled to the second node, and wherein the parasitic capacitor has a first terminal coupled to the second node, and a second terminal coupled to the ground.

6. The power supply device as claimed in claim 5, wherein the delay and stabilization circuit comprises:
a Zener diode, wherein the Zener diode has an anode coupled to the ground, and a cathode coupled to the fourth node.

7. The power supply device as claimed in claim 6, wherein the delay and stabilization circuit further comprises:
a first capacitor, wherein the first capacitor has a first terminal coupled to the second node, and a second terminal coupled to the fourth node; and
a fifth diode, wherein the fifth diode has an anode coupled to a fifth node, and a cathode coupled to the second node.

8. The power supply device as claimed in claim 7, wherein the second main coil has a first terminal coupled to the second node for receiving the resonant voltage, and a second terminal coupled to the ground, and wherein the second secondary coil has a first terminal coupled to a sixth node for outputting the control voltage, and a second terminal coupled to the ground voltage.

9. The power supply device as claimed in claim 8, wherein the output stage circuit comprises:
a second transistor, wherein the second transistor has a control terminal coupled to the sixth node for receiving the control voltage, a first terminal coupled to an output node for outputting the output voltage, and a second terminal coupled to the third node for receiving the induced voltage.

10. The power supply device as claimed in claim 9, wherein the output stage circuit further comprises:
a first resistor, wherein the first resistor has a first terminal coupled to the third node, and a second terminal coupled to a seventh node; and
an inductor, wherein the inductor has a first terminal coupled to the seventh node, and a second terminal coupled to an eighth node.

11. The power supply device as claimed in claim 10, wherein the output stage circuit further comprises:
a third transistor, wherein the third transistor has a control terminal coupled to the sixth node for receiving the control voltage, a first terminal coupled to a ninth node, and a second terminal coupled to the eighth node.

12. The power supply device as claimed in claim 11, wherein the output stage circuit further comprises:
a sixth diode, wherein the sixth diode has an anode coupled to the ninth node, and a cathode coupled to the output node; and
a second capacitor, wherein the second capacitor has a first terminal coupled to the output node, and a second terminal coupled to the ground voltage.

13. The power supply device as claimed in claim 12, wherein the output stage circuit further comprises:
a second resistor, wherein the second resistor has a first terminal coupled to the eighth node, and a second terminal coupled to the ground voltage; and
a seventh diode, wherein the seventh diode has an anode coupled to the eighth node, and a cathode coupled to a tenth node for outputting the feedback voltage.

14. The power supply device as claimed in claim 13, wherein the third main coil has a first terminal coupled to the tenth node for receiving the feedback voltage, and a second terminal coupled to the ground voltage, and wherein the third secondary coil has a first terminal coupled to the fifth node, and a second terminal coupled to the ground.

* * * * *